United States Patent [19]

Rueckl et al.

[11] Patent Number: 4,480,859
[45] Date of Patent: Nov. 6, 1984

[54] FLEXIBLE CONNECTOR FOR FLAT WALL DUCTING

[75] Inventors: Todd J. Rueckl, Luxemburg; Craig T. Pahnke, Denmark, both of Wis.

[73] Assignee: W. R. Grace & Co., New York, N.Y.

[21] Appl. No.: 392,555

[22] Filed: Jun. 28, 1982

[51] Int. Cl.³ .................................. F16L 27/00
[52] U.S. Cl. ............................ 285/163; 285/223; 285/231; 285/424
[58] Field of Search ............. 285/163, 166, 424, 223, 285/231, 176, 184

[56] References Cited

U.S. PATENT DOCUMENTS

| | | | |
|---|---|---|---|
| 1,772,547 | 8/1930 | Keese et al. | 285/166 X |
| 2,805,401 | 9/1957 | Crowley | 285/184 X |
| 2,845,283 | 7/1958 | Kuhn | 285/166 |
| 3,183,607 | 5/1965 | Beachler | 34/122 |
| 3,301,940 | 1/1967 | Rischard et al. | 285/223 X |
| 3,739,491 | 6/1973 | Creapo et al. | 34/156 |
| 4,130,463 | 12/1978 | Klavir | 285/184 X |
| 4,420,017 | 12/1983 | Moritz | 285/163 X |

Primary Examiner—Thomas F. Callaghan
Attorney, Agent, or Firm—James E. Nilles

[57] ABSTRACT

A flexible connector for flat wall sheet metal ducting comprises an elongated sleeve duct of rectangular cross-section and a pair of connector ducts, each having an end portion telescoped into an end portion of the sleeve duct with the walls of the connector duct in widthwise parallel inwardly spaced relation to respective walls of the sleeve duct. A resiliently compressible gasket is secured in the sleeve duct near each end thereof, surrounding and compressed against the adjacent connector duct, which is slidable in the gasket so that the sleeve duct can swing in a pair of opposite directions relative to the connector duct. Each of a pair of opposite walls of each connector duct has an exterior surface defined by a false wall which is arcuately curved along its length concentrically to the axis about which the sleeve duct swings. To confine the sleeve duct against substantial lengthwise displacement relative to the connector ducts, each connector duct has abutments near said axis, engaging end edges of sleeve duct walls that extend widthwise in said opposite directions.

3 Claims, 5 Drawing Figures

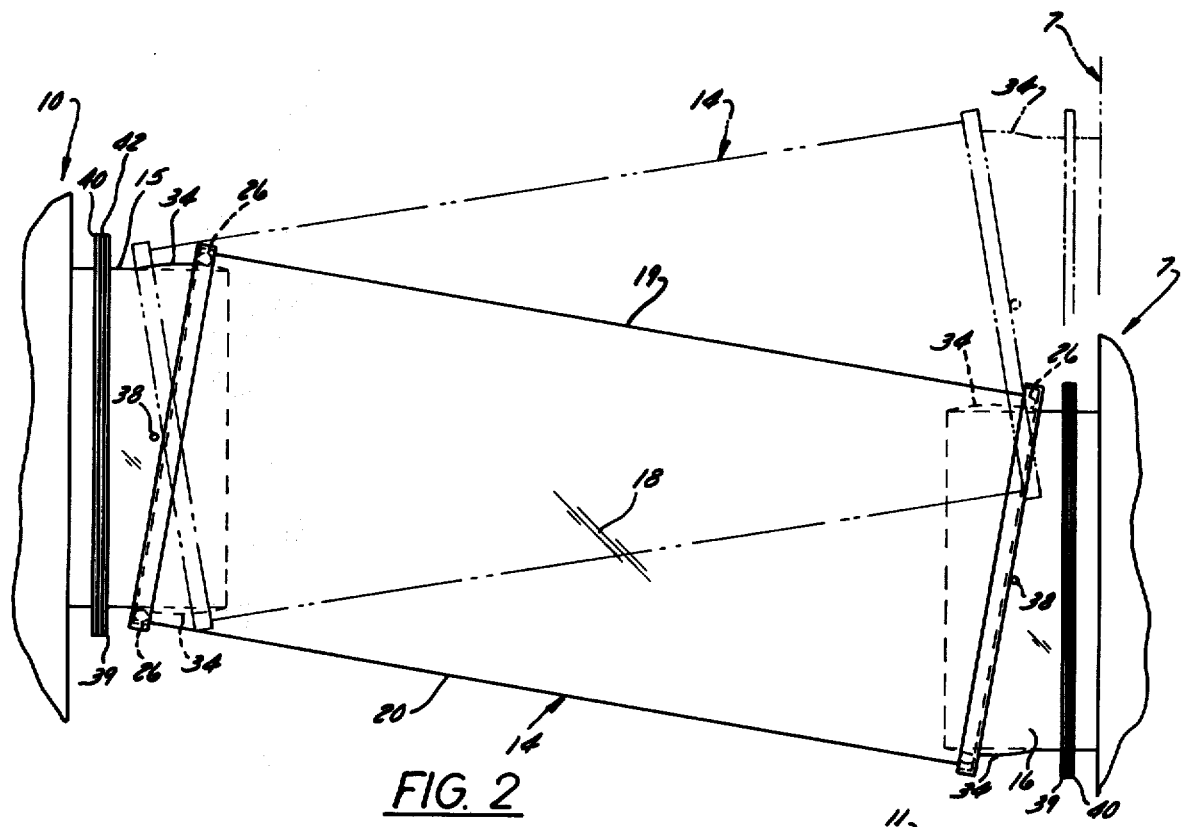
FIG. 2
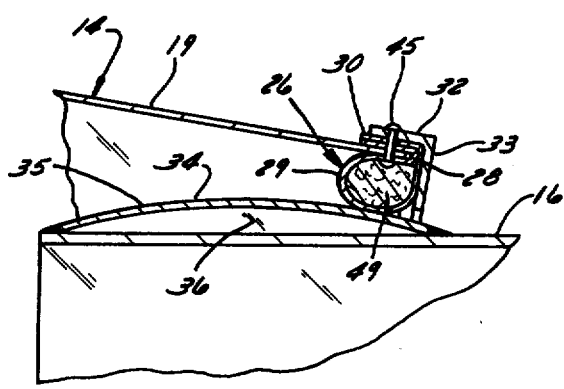
FIG. 4
FIG. 3

FLEXIBLE CONNECTOR FOR FLAT WALL DUCTING

FIELD OF THE INVENTION

This invention relates to a flexible connector for rectangular-section sheet metal ducts that carry a gaseous medium such as pressure air; and the invention is more specifically concerned with a flexible connector for such ducts that comprises substantially rigid sheet metal elements which are sealed to one another but are nevertheless so connected as to be relatively swingable in a pair of opposite directions through substantially large angles.

BACKGROUND OF THE PRIOR ART

It is conventional to use sheet metal ducts of rectangular cross-section for conducting pressure air in ovens, blowers and similar apparatus and for conducting suction air from exhaust hoods and the like. Such ducting can be fabricated quickly, easily and at low cost. Heretofore, however, there has not been a completely satisfactory flexible connector for such ducting whereby pressure air, suction air, hot gas or the like can be conducted between a stationary apparatus element such as a blower inlet or outlet and an apparatus element such as a nozzle or a suction inlet that undergoes a substantial amount of movement in a pair of opposite directions.

U.S. Pat. No. 3,739,491, to Creapo et al, typifies apparatus wherein a flexible duct connector of the type here under consideration would be useful but wherein an altogether different type of connection was employed to avoid the disadvantages of prior flexible connectors. That patent relates to a web dryer comprising an oven through which a straight stretch of freshly imprinted lengthwise moving web extends and wherein the web is contactlessly supported by two sets of elongated air nozzles of the type known as air bars. One set of air bars is mounted beneath the path of the web to blow upwardly against it and levitate it; the other set is mounted above the path of the web to blow downwardly against it. The air issuing from both sets of nozzles may be heated, for drying the ink on the web. When the apparatus is in operation, there is a relatively narrow space between the two sets of air bars, and therefore, to facilitate threading a web through that space, the lower set of air bars is mounted for movement between a raised operative position and a lowered web threading position. Pressure air is fed into both sets of air bars from a system of stationary ducts connected with a blower. To accommodate the up and down movement of the lower set of air bars, the stationary duct system and the lower air bar assembly have rectangular-section duct elements which project horizontally towards one another and meet at a joint defined by mating duct element surfaces that are inclined to the vertical. Because of the inclination of the plane of separation of the joint surfaces, the joint forms a closed connection when the lower air bar assembly is in its raised operative position but is open whenever the lower air bars are below that position. Although inexpensive and satisfactory for some applications, such a joint tends to leak after a period of use and is therefore not suitable for apparatus wherein leakage is not acceptable, as is usually the case with large installations.

There are also installations in which a leak-proof flexible connection is mandatory because air or other gas must be conducted to or from a movable apparatus element in all positions of its motion. Typically, it is often required that suction air be drawn from a retractable dryer hood when it is in a retracted or raised position as well as when it is in a normal operating position. Or, as exemplified by U.S. Pat. No. 3,183,607, it may be necessary to draw suction air from a movable apparatus element in one of its positions and supply it with pressure air in another position, and to apply suction and pressure alternately to a stationary duct element to which the movable apparatus element has a flexible connection.

Heretofore, flexible connectors suitable for installations of the above described character have usually been made up of flexible materials, most often coated woven materials or elastomers. Such materials are expensive, and fabricating them into ducting connectors requires techniques quite different from those needed for manufacturing and assembling sheet metal ducting itself. Connectors made of flexible materials also have serious disadvantages in service, in that they are subject to wear and ripping, and the connector must be replaced if it develops any small hole or tear, often at the cost of considerable down time in addition to the cost of the replacement connector and its installation. An additional disadvantage is that the flexible materials commonly used for such connectors have temperature limitations which make them unsuitable for oven installations and the like wherein they are contacted by very hot gases. Where high temperatures were involved, flexible connectors have been made of asbestos, but that material has become so expensive—owing to environmental protection measures needed in its manufacture—that the cost of an asbestos flexible connector is nearly prohibitive.

U.S. Pat. No. 4,130,463, to S. N. Klavir, discloses a rectangular-section duct connector that is intended for the rather specialized purpose of conducting gas between two coupled railway cars. It comprises two rectangular cross-section duct components, one of which is sector-shaped in plan view and is partially received in the other. The cost of the connector is disproportionately high for general use in rectangular-section sheet metal ducting because its two duct components are connected by a hinge joint which extends vertically along the narrow side of the sector-shaped component and which must be accurately welded to both components. Furthermore, the structure provides a clearance between adjacent matingly curved side wall surfaces of the two duct components, to enable them to pass each other as the one pivots relative to the other. That clearance, according to the patent, is intended to "minimize the escape of emissions between the surfaces," but it obviously does not prevent leakage that would be very undesirable in most ducting installations.

U.S. Pat. No. 2,805,401, to J. C. Crowley, discloses a hinge joint connection for a form of square ducting employed as a wave guide for microwave radiation. As might be expected from its very specialized application, the structure is too complicated and expensive to be suitable for sheet metal ducting.

One type of flexible connector heretofore devised and found satisfactory for a very limited range of applications has comprised a pair of rectangular cross-section duct elements that had a telescoped connection with one another. The outside cross-section dimensions of the inner telescoped duct element were sufficiently smaller than the inside dimensions of the outer one to permit limited relative swinging motion between the telescoped duct elements. To provide a seal between them, a resiliently compressible gasket was secured to the outer duct element, in surrounding relation to the inner one. Because of its resilient compressibility, the gasket maintained a seal while accommodating swinging of the telescoped duct elements, but the angle through which they could be swung was obviously rather small, and therefore this prior flexible connector was not suitable for a compact installation that could accommodate a substantial travel of the movable apparatus element with which it was connected.

SUMMARY OF THE INVENTION

The general object of the present invention is to provide a compact flexible connector for conducting gaseous medium between a relatively stationary apparatus element and an apparatus element that is movable through substantial distances in a pair of opposite directions, which connector comprises substantially only metal components and is readily connectable with conventional sheet metal ducting of rectangular cross-section.

A more specific object of this invention is to provide a relatively short flexible connector of the character described, having seals of non-metallic material that are inexpensive and easily replaced and whereby the connector is maintained leak-proof through a substantial range of travel of the movable apparatus element and through a long useful life.

A further object of this invention is to provide a flexible connector of the character described that can be readily fabricated with the same equipment and techniques employed in producing the duct system in which the connector is incorporated.

BRIEF DESCRIPTION OF DRAWINGS

In the accompanying drawings, which illustrate what is now regarded as a preferred embodiment of the invention:

FIG. 2 is a view in side elevation of the flexible connector of this invention;

FIG. 3 is a view in longitudinal section, on a larger scale, of the telescoped joint between the sleeve duct and one of the connector ducts;

FIG. 4 is a detail view in longitudinal section of a portion of the gasket and one of the false walls at the telescoped joint shown in FIG. 3.

DETAILED DESCRIPTION OF THE PREFERRED EMBODIMENT OF THE INVENTION

Figure 1:
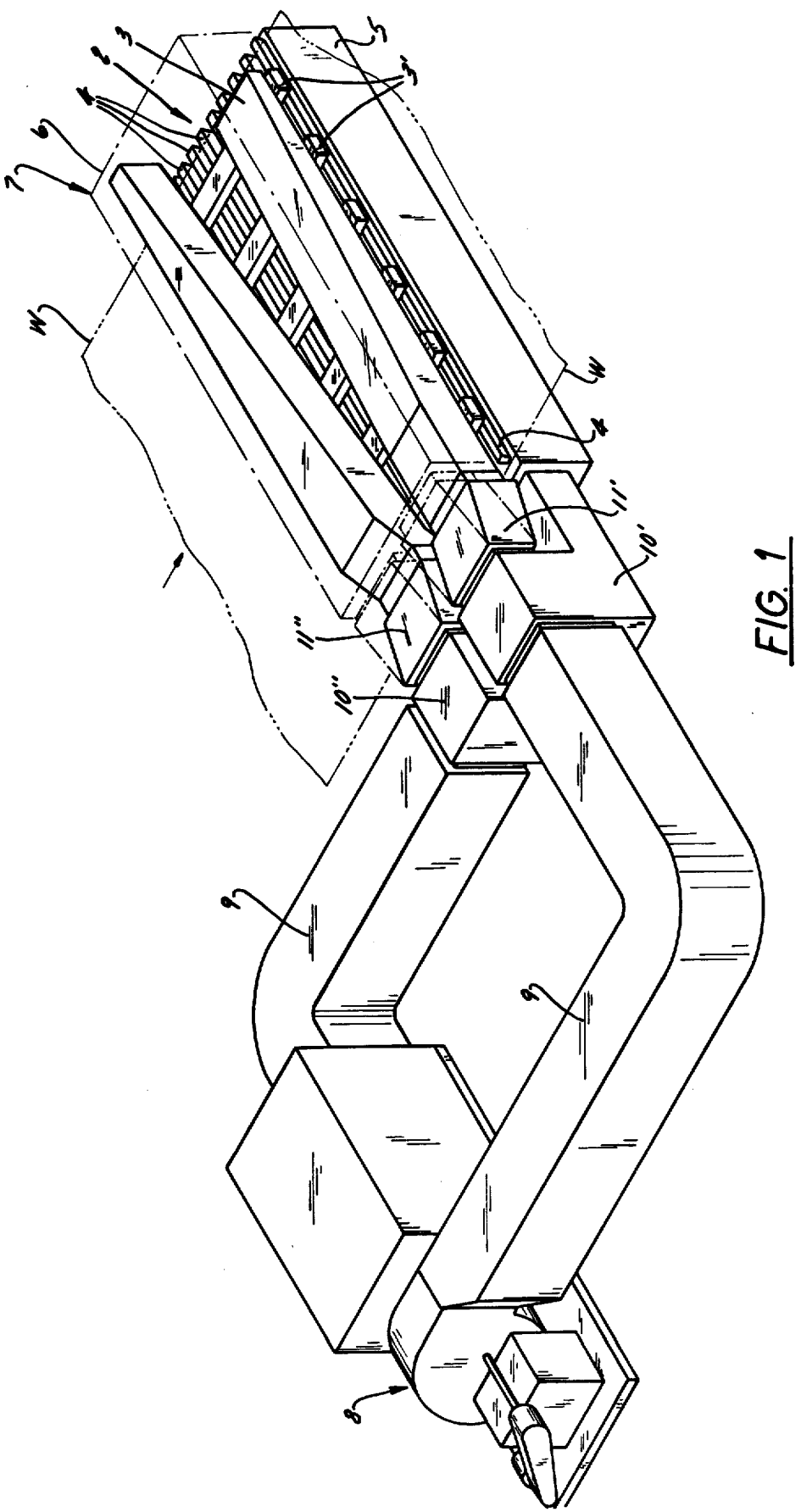
FIG. 1 is a perspective view, with portions shown cut away, of web drying apparatus incorporating flexible duct connectors that embody the principles of this invention.
Figure 5:
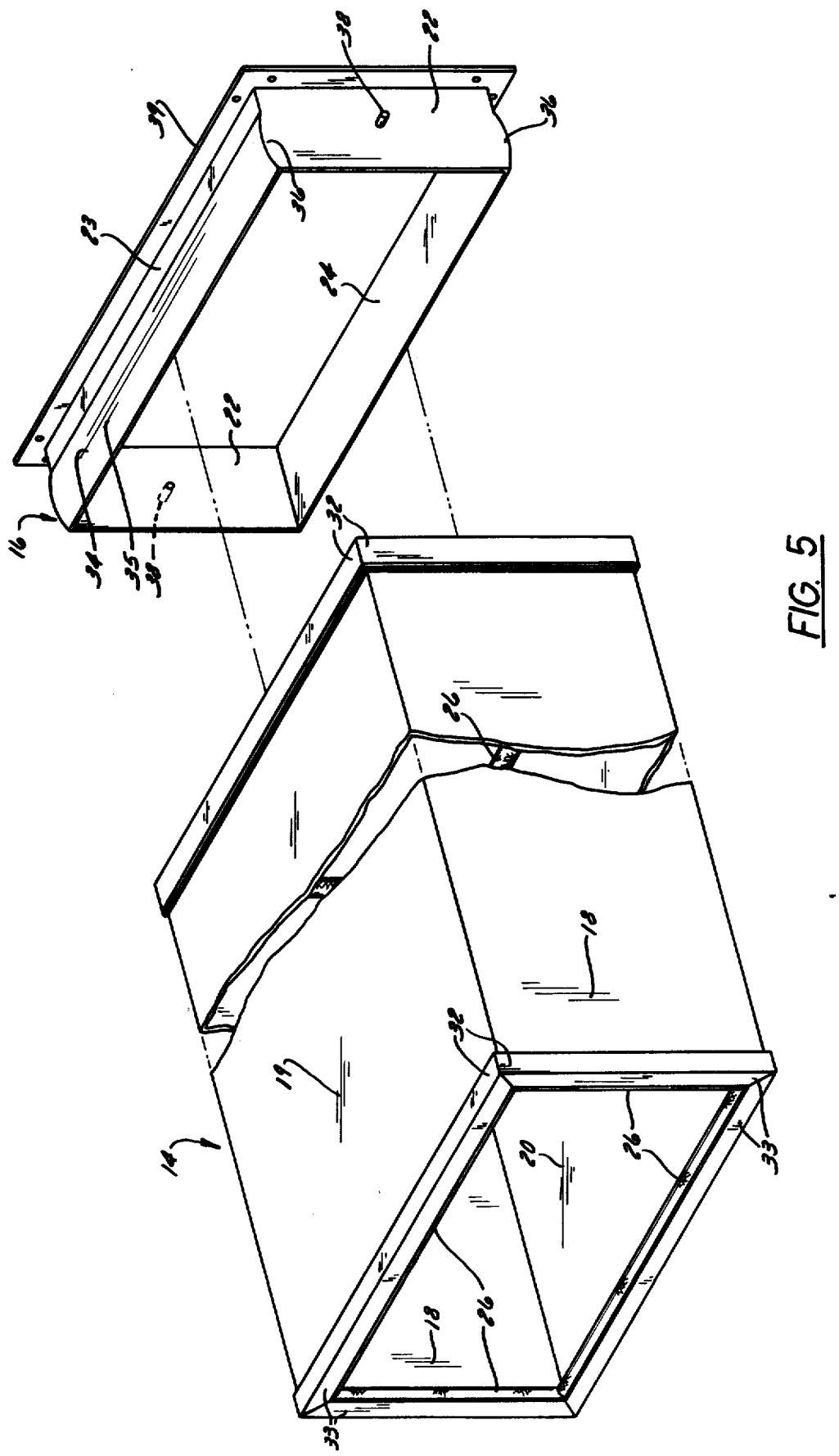
FIG. 5 is a disassembled perspective view of the sleeve duct and one of the connector ducts of the flexible connector.

The illustrative apparatus depicted in FIG. 1 is of a generally known type, employed for drying a straight stretch of lengthwise moving web W and comprising an upper air bar assembly 2 and a lower air bar assembly (not shown). The upper air bar assembly 2 comprises a main duct 3 that extends across the web W and communicates with several headers 3' that extend lengthwise of the web. Air bars 4 extend across the web at closely spaced intervals along its length, and each air bar is communicated with the several headers 3'. It will be understood that the lower air bar assembly is generally like the upper one.

An enclosure around the air bar assemblies comprises a stationary lower enclosure member 5 and a hood-like vertically movable upper enclosure member 6. The apparatus is generally conventional in that the upper air bar assembly 2 is within the hood-like upper enclosure member 6 and travels up and down with it to comprise with it a movable apparatus element 7.

In addition to the lower enclosure member 5 and the lower air bar assembly, stationary parts of the apparatus comprise a blower 8 and ducting 9 whereby the outlet side of the blower 8 is connected with a pressure plenum 10' and the inlet side of the blower is connected with a suction plenum 10". Each plenum 10', 10" thus comprises a stationary apparatus element which is connected with the movable apparatus element 7 by means of a flexible connector 11', 11", respectively, that embodies the principles of this invention. Pressure air from the blower 8 is conducted to the air bar assembly 2 of the movable apparatus element 7 by way of the flexible connector 11' in its connection to the plenum 10'; and through the flexible connector 11" and the plenum 10" return air is drawn out of the upper enclosure member 4 and back into the blower 8 to be returned to the air bar assemblies. Between the plenum 10" and the blower 8 the return air passes through a heater 12 so that the pressure air emerges from the air bars at a high temperature that promotes drying of the web W.

It will be understood that there are stationary duct connections between the pressure plenum 10' and the lower air bar assembly and between the suction plenum 10" and the lower enclosure member 5.

The apparatus element 7 is vertically movable so that it can be raised to a retracted position in which it leaves the space between the air bar assemblies readily accessible for threading the web W therethrough. If the blower 8 is kept running while the upper enclosure member 6 is raised, fumes will be drawn out of the area because the flexible connector 11" maintains a connection between that enclosure member and the blower inlet. It will be evident that the flexible connector 11' allows the lowered operative position of the movable apparatus element 7 to be a single defined position or to be any one of several positions within a range of adjustment.

In any case, each flexible connector 11 of this invention maintains a leak-proof connection between a fixed apparatus element 10 and a movable apparatus element 7 throughout the entire range of vertical travel of the movable element, notwithstanding that the amount of such travel is substantial but the length of each flexible connector is relatively short. Note that each connector 11 accommodates travel of the movable apparatus element 7 in a pair of opposite directions that are transverse to the length of the connector.

A flexible connector 11 of this invention comprises an elongated sleeve duct 14 that has respective end portions near the stationary apparatus element 10 and the movable apparatus element 7, together with a pair of connector ducts 15 and 16, one for each of the apparatus elements 7 and 10, each having a telescoped connection with its adjacent end portion of the sleeve duct 14.

The sleeve duct 14 and the connector ducts 15 and 16 are of sheet metal construction and of rectangular cross-section, generally conforming to the flat wall sheet metal ducting 9 of the apparatus in which the connector 11 is installed. Each of the connector ducts 15, 16 can be relatively short, and the two can be identical with one another, although one or both could comprise an end portion of a substantially long duct section comprising the apparatus element 7 and/or 10.

As here shown, the telescoped joint comprising each connector duct 15, 16 and its adjacent end portion of the sleeve duct 14 is arranged with the connector duct inside the sleeve duct. Each telescoped joint therefore comprises an inner duct (in this case a connector duct 15 or 16) and an outer duct (in this case the sleeve duct 14). It will be apparent that the illustrated relationship could be reversed at either or both telescoped connections so that the sleeve duct would be the inner duct and the connector duct would be the outer duct.

The rectangular cross-section of the sleeve duct 14 and of the two connector ducts 15 and 16 is defined in each case by two pairs of opposite walls. The two walls of one of these pairs are flat and extend widthwise parallel to the directions of motion which the flexible connection must accommodate; the other two walls extend widthwise transversely to those directions. Thus, in the illustrated structure wherein the apparatus element 7 is movable up and down, the sleeve duct 14 has one pair of opposite flat walls 18 that have their widths oriented vertically, and they can therefore be regarded as side walls. The other two opposite walls 19, 20 of the sleeve duct extend widthwise horizontally, and they can therefore be considered a top wall and a bottom wall, respectively. In like manner, each connector duct 15, 16 has widthwise vertically extending side walls 22 and widthwise horizontally extending top and bottom walls 23 and 24. The several side walls 18 and 22 at each telescoped joint are flat and parallel to one another, but the top and bottom walls are configured as explained hereinafter to accommodate substantial vertical swinging of the telescoped ducts relative to one another.

At each telescoped joint, each of the side walls 22 of the inner duct is spaced a small distance inward from its flatwise adjacent side wall 18 of the outer duct, and the top and bottom walls 23, 24 of the inner duct are likewise spaced from the respective top and bottom walls 19, 20 of the outer duct. The spaces between adjacent walls are sealed by a resiliently compressible gasket 26 that is secured to the outer duct as explained hereinafter and surrounds the inner duct. Because the gasket 26 is confined under compression between the walls of the inner and outer ducts, all around both of them, it maintains good sealing engagement with both of the telescoped ducts, notwithstanding that the inner duct is slidable on the gasket.

In the preferred form of the gasket 26 it comprises, at each telescoped joint, a separate length of gasket material for each of the four walls of the outer duct, and for a high temperature application each such length of gasket material can be a strip of woven asbestos fabric that is looped upon itself widthwise to define a so-called tadpole. As seen in cross-section (see FIG. 4) each gasket strip has one marginal portion 28 along its length that flatwise overlies the inner surface of an outer duct wall, with its longitudinal edge at the end edge of that wall; and the strip is curved widthwise into a loop 29 inside the wall and thence bent around the end edge of the wall to have its opposite marginal portion 30 flatwise overlie the outer surface of the wall. The portion 30 of the gasket strip that is at the exterior of the outer duct wall is flatwise clamped thereto by one leg 32 of an L-section angle iron that has its other leg 33 projecting across the end edge of the duct wall. The angle iron 32, 33 can be secured in place by means of rivets 45 that extend through its leg 32, through the duct wall and through the flat portions 28 and 30 of the gasket strip that overlie the opposite surfaces of the duct wall. The looped medial portion 29 of the gasket strip comprises the gasket proper. It can be filled with a padding 49 similar to steel wool that helps to maintain its resilient compressibility. Where high temperatures are not involved, the gasket 26 can be of elastomeric material.

At each telescoped joint, to accommodate relatively large angles of swing between the telescoped ducts, each of the top and bottom walls 23, 24 of the inner duct has an exterior surface 34 that is convexly curved along its length for a distance back from its end edge that is within the outer duct. The surface 34 curves concentrically to an axis which is normal to the side walls 22 of the inner duct, midway between its top and bottom walls 23, 24, and which extends through the telescoped end portions of the inner and outer ducts, said axis being the one about which the sleeve duct 14 swings relative to the telescoped connector duct 15 or 16. Stated another way, the curvature of the surfaces 34 is such that said surfaces at each telescoped joint maintain uniform compressive and sliding engagement with the gasket 26 through a substantial angle of swing of the inner duct relative to the outer duct. Preferably each of the top and bottom walls 23, 24 proper of the inner duct is flat along its entire length, and the curved exterior surface 34 of the wall is defined by a short arcuately curved false wall member 35 that is secured as by welding to the exterior of the wall itself. The side walls 22 of the inner duct have edgewise outward projections 36 with edges that are curved to the same radius as the false walls and extend along the side edges of the false walls. These projections 36 close the dead spaces between the false wall members 35 and their adjacent top and bottom walls 23, 24 proper, to prevent leakage around the gasket 26 through those spaces.

To prevent the sleeve duct 14 from shifting lengthwise out of telescoped relation to the connector ducts 15, 16, or either of them, the inner one of the telescoped ducts at each telescoped joint—in this case, each connector duct—has outwardly projecting abutments 38 on its side walls that engage end edge portions of the outer duct in one position of the movable apparatus element 7. Each abutment 38 can comprise a pin or stud that is welded to the exterior surface of a side wall 22 of the connector duct to project outwardly from the side wall substantially normal thereto, for making substantially only point contact with the outer duct. As shown, each abutment 38 is near the axis of swinging motion of the telescoped ducts and therefore engages the sleeve duct 14 only at the midpoint of its range of swing. Alternatively there could be two abutments on each connector duct side wall, one above and one below the axis about which the sleeve duct swings relative to the connector duct, each such abutment being engaged with the sleeve duct only at one of the limits of swinging motion of the sleeve duct.

The preferred construction here illustrated has relatively short connector ducts 15, 16, each of which has a flange 39 on its end remote from the sleeve duct for making a flatwise abutting connection with a similar but opposing flange 40 on its adjacent apparatus element 7, 10. The flatwise opposing flanges 39, 40 can be releasably secured to one another by bolts 41 or the like, and there can be a conventional flat gasket 42 between them to provide a seal. Disconnecting the flange connection for either connector duct 15 or 16 of course allows that connector duct to be swung substantially beyond the range of its operating positions, for disassembly of the telescoped joints to permit inspection or replacement of the compressible gasket 26.

With the preferred arrangement, wherein the connector ducts 15, 16 are telescoped into the sleeve duct 14, the sleeve duct necessarily has somewhat greater cross-section area than the connector ducts and therefore presents no restriction of flow through the flexible connection.

From the foregoing description taken with the accompanying drawings, it will be apparent that this invention provides a flexible connector for sheet metal ducting of rectangular cross-section, which connector, although short and compact, accommodates frequent and substantial motion in a pair of opposite directions of one of two apparatus elements that it connects and maintains a seal throughout the travel of the movable apparatus element. It will also be apparent that the connector of this invention comprises essentially only rigid parts that can be readily and inexpensively produced with the employment of techniques that are conventional in the fabrication of rectangular sheet metal ducting.

What is claimed as the invention is:

1. Flexible duct means for conducting gaseous medium between a pair of apparatus elements that are spaced apart in one direction and one of which is movable relative to the other in a pair of opposite directions that are substantially transverse to said one direction, said flexible duct means being characterized by:
   A. an elongated rigid sleeve duct extending between said elements with an end portion adjacent to each of them and having a rectangular cross-section at each said end portion defined by pairs of opposite walls;
   B. a pair of rigid connector ducts, one for each of said apparatus elements, each said connector duct having an end portion of rectangular cross-section defined by pairs of opposite walls;
   C. each said connected duct having its said end portion in telescoped relation to an end portion of the sleeve duct to define at each end of the sleeve duct a telescoped joint that comprises an inner duct and and outer duct surrounding it;
   D. each of the telescoped ducts at each said joint having one pair of opposite flat walls that extend widthwise substantially in said opposite directions;
   E. the inner duct at each said joint having on each of its other pair of opposite walls an external surface that is convexly curved lengthwise on a constant radius such that said external surface maintains a constant small distance from its adjacent interior surface of the outer duct as the telescoped ducts are swung in said opposite directions relative to one another;
   F. a resiliently compressible gasket secured to the outer duct at each said joint, the inner duct being surrounded by said gasket and slidable therein and said gasket being compressed between the inner duct and the outer duct to seal the joint; and
   G. the inner duct at each said joint having an outwardly projecting abutment on each of the walls of its said one pair, engaging the end edge of the flatwise adjacent wall of the outer duct in one position of said one apparatus element, said abutments substantially confining the sleeve duct against lengthwise displacement out of telescoped relation to the connector ducts.

2. The flexible duct means of claim 1 wherein, at each telescoped joint, each wall of said other pair of walls of the inner duct is flat, further characterized by:
   (1) said curved external surface on each of those walls being defined by an arcuately curved false wall secured thereto; and
   (2) said one pair of opposite flat walls of the inner duct having edge portions that are joined to said flat walls and curved to said radius, so that the spaces between said false walls and said flat walls are substantially completely closed.

3. A flexible connector for rectangular cross-section sheet metal ducting whereby gaseous medium can be conducted between a pair of apparatus elements that are spaced apart in one direction and one of which is movable relative to the other in a pair of opposite directions that are substantially transverse to said one direction, said flexible connector being characterized by:
   A. an elongated rigid sleeve duct extending between said elements with an end portion near each of them, said sleeve duct having two pairs of opposite flat walls, the walls of one of said pairs extending widthwise in said opposite directions;
   B. a pair of rigid connectors ducts, one for each of said apparatus elements, each said connector duct having an end portion telescoped into an end portion of the sleeve duct with its walls in inwardly spaced widthwise parallel relation to respective walls of the sleeve duct;
   C. each said connector duct having a pair of opposite walls which extend widthwise transversely to said opposite directions and each of which has an outer surface that is arcuately curved lengthwise along the wall concentrically to an axis which extends through said telescoped end portions of the ducts and about which the sleeve duct is swingable in said opposite directions;
   D. a resiliently compressible gasket secured to the sleeve duct adjacent to each end thereof, each said gasket being in surrounding relation to a connector duct, and each connector duct being slidable relative to its surrounding gasket and maintaining the same compressed against the sleeve duct; and
   E. each connector duct having a pair of pinlike abutments thereon which engage end edges of said one pair of walls of the sleeve duct in at least one position of said movable element, to confine the sleeve duct against substantial endwise displacement relative to the connector ducts.

* * * * *